US011212654B2

(12) United States Patent
Bai et al.

(10) Patent No.: US 11,212,654 B2
(45) Date of Patent: Dec. 28, 2021

(54) COORDINATED DRIVING THROUGH DRIVER-TO-DRIVER V2X COMMUNICATION

(71) Applicant: Honda Motor Co., Ltd., Tokyo (JP)

(72) Inventors: Xue Bai, Novi, MI (US); Ehsan Moradi-Pari, West Bloomfield, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 15/942,939

(22) Filed: Apr. 2, 2018

(65) Prior Publication Data

US 2018/0227729 A1 Aug. 9, 2018

Related U.S. Application Data

(63) Continuation-in-part of application No. 14/931,926, filed on Nov. 4, 2015, now Pat. No. 10,309,791.

(51) Int. Cl.
*H04W 4/46* (2018.01)
*B60W 30/09* (2012.01)
(Continued)

(52) U.S. Cl.
CPC .............. *H04W 4/46* (2018.02); *B60W 30/09* (2013.01); *B60W 30/143* (2013.01); *B60W 30/165* (2013.01); *G01C 21/3453* (2013.01); *G01C 21/3688* (2013.01); *G05D 1/0212* (2013.01); *G05D 1/0295* (2013.01); *G08G 1/22* (2013.01); *B60W 2050/0075* (2013.01); *B60W 2556/45* (2020.02); *B60W 2556/55* (2020.02);
(Continued)

(58) Field of Classification Search
CPC ....... H04W 4/46; H04W 4/80; B60W 30/143; B60W 30/09
See application file for complete search history.

(56) References Cited

U.S. PATENT DOCUMENTS 8,643,505 B2 2/2014 Tsuda et al.
8,744,666 B2 6/2014 Switkes et al.
(Continued)

FOREIGN PATENT DOCUMENTS

WO WO2007044210 4/2007
WO WO2017003405 1/2017
WO WO2017011039 1/2017

OTHER PUBLICATIONS

Office Action of U.S. Appl. No. 14/931,926 dated May 31, 2018, 23 pages.
(Continued)

*Primary Examiner* — Mathew Franklin Gordon
(74) *Attorney, Agent, or Firm* — Rankin, Hill & Clark LLP

(57) ABSTRACT

According to one or more aspects, a system for coordinated driving may include a vehicle communication system receiving a proposed driving maneuver from a tractor vehicle, an input device receiving a response to the proposed driving maneuver from an occupant of a trailer vehicle, and a route generation module generating a route corresponding to the proposed driving maneuver based on the response to the proposed driving maneuver. The tractor vehicle may be engaged in segment-by-segment coordinated driving with the trailer vehicle utilizing a cooperative adaptive cruise control (CACC) module.

20 Claims, 14 Drawing Sheets

(51) Int. Cl.
- *B60W 30/14* (2006.01)
- *G08G 1/00* (2006.01)
- *B60W 30/165* (2020.01)
- *G01C 21/34* (2006.01)
- *G05D 1/02* (2020.01)
- *G01C 21/36* (2006.01)
- *H04W 4/80* (2018.01)
- *G01S 13/931* (2020.01)
- *B60W 50/00* (2006.01)

(52) U.S. Cl.
CPC .. *B60W 2556/65* (2020.02); *G01S 2013/9316* (2020.01); *G01S 2013/9325* (2013.01); *H04W 4/80* (2018.02)

(56) References Cited

U.S. PATENT DOCUMENTS

| | | | |
|---|---|---|---|
| 8,942,864 B2 | 1/2015 | Nemoto | |
| 9,043,141 B2 | 5/2015 | Kono et al. | |
| 9,076,341 B2* | 7/2015 | Funabashi | G08G 1/163 |
| 9,150,220 B2* | 10/2015 | Clarke | B60W 40/076 |
| 9,165,470 B2 | 10/2015 | Mudalige et al. | |
| 2007/0005218 A1* | 1/2007 | Ueyama | B60W 30/16 |
| | | | 701/96 |
| 2007/0083318 A1* | 4/2007 | Parikh | B60W 10/06 |
| | | | 701/96 |
| 2009/0140887 A1 | 6/2009 | Breed et al. | |
| 2011/0153629 A1 | 6/2011 | Lehmann et al. | |
| 2012/0041675 A1* | 2/2012 | Juliver | G06Q 30/0283 |
| | | | 701/465 |
| 2012/0306634 A1* | 12/2012 | Tsuda | B60Q 1/2611 |
| | | | 340/425.5 |
| 2013/0046457 A1 | 2/2013 | Pettersson | |
| 2013/0219294 A1 | 8/2013 | Goldman-Shenhar et al. | |
| 2015/0120126 A1 | 4/2015 | So et al. | |
| 2015/0127189 A1* | 5/2015 | Mehr | B60W 30/165 |
| | | | 701/1 |
| 2015/0276422 A1 | 10/2015 | Bouve | |
| 2016/0071418 A1* | 3/2016 | Oshida | G08G 1/22 |
| | | | 701/23 |
| 2016/0267795 A1 | 9/2016 | Miyazawa et al. | |

OTHER PUBLICATIONS

Article: Wu et al.: "A Partial Flexibility Model for Vehicle Following Algorithm", 2013 IEEE 8th Conference on Industrial Electronics and Applications (ICIEA), 6 pages.

Article: Ng et al.: "Autonomous Vehicle-Following Systems: A Virtual Trailer Link Model", 6 pages.

Article: Milanés et al.: "Cooperative Adaptive Cruise Control in Real Traffic Situations", IEEE Transactions on Intelligent Transportation Sysytems, vol. 15, No. 1, Feb. 2014, 10 pages.

Article: Naus et al.: "Cooperative adaptive cruise control, design and experiments" 6 pages.

* cited by examiner

COORDINATED DRIVING THROUGH DRIVER-TO-DRIVER V2X COMMUNICATION

CROSS-REFERENCE TO RELATED APPLICATIONS

This application is a continuation-in-part and claims priority to U.S. Non-Provisional patent application Ser. No. 14/931,926 entitled "VIRTUAL TOWING", filed on Nov. 4, 2015; the entirety of the above-noted application(s) is incorporated by reference herein.

BACKGROUND

Vehicle to vehicle (V2V) communications enables vehicles to exchange information, including vehicle position, current speed, rate of acceleration and deceleration, and braking status. Several applications are being proposed using V2V communications as a foundational technology. Each vehicle may act as a node in a dedicated short-range communications (DSRC) network, thereby enabling vehicles to communicate with one another.

BRIEF DESCRIPTION

According to one or more aspects, a system for coordinated driving may include a vehicle communication system receiving a proposed driving maneuver from a tractor vehicle, an input device receiving a response to the proposed driving maneuver from an occupant of a trailer vehicle, and a route generation module generating a route corresponding to the proposed driving maneuver based on the response to the proposed driving maneuver.

The tractor vehicle may be engaged in segment-by-segment coordinated driving with the trailer vehicle utilizing a cooperative adaptive cruise control (CACC) module. The proposed driving maneuver may correspond to a driving maneuver currently being executed or already executed by the tractor vehicle. The proposed driving maneuver may be a lane change maneuver, a passing maneuver, an acceleration maneuver, a deceleration maneuver, a stop maneuver, a turning maneuver, or a parking maneuver.

The vehicle communication system may disengage the coordinated driving between the tractor vehicle and the trailer vehicle based on the response including a decline to the proposed driving maneuver. The route generation module may generate the route corresponding to the proposed driving maneuver based on the response including an acceptance of the proposed driving maneuver.

The system may include a vehicle sensor detecting an obstacle in an operating environment. The proposed driving maneuver may correspond to a driving maneuver already executed by the tractor vehicle at a first time, where the tractor vehicle executing the driving maneuver is unimpeded by the obstacle. The vehicle sensor may detect the obstacle at a second time after the first time, the obstacle impeding the route corresponding to the proposed driving maneuver. The system may include a coordinated driving module determining an alternative route corresponding to the proposed driving maneuver. The alternative route may include a delayed implementation of the route corresponding to the proposed driving maneuver or a different path than the already executed driving maneuver.

The route generation module may generate the route corresponding to the proposed driving maneuver based on the response including an acceptance of the proposed driving maneuver. The vehicle communication system may receive an updated driving maneuver from the tractor vehicle. The route generation module may automatically generate an updated route corresponding to the driving maneuver and updated driving maneuver based on the response including the already accepted proposed driving maneuver.

The vehicle communication system may automatically respond to the proposed driving maneuver with a decline based on a detected obstacle. The system may include a cooperative adaptive cruise control (CACC) module determining an execution parameter associated with the route corresponding to the proposed driving maneuver including a velocity, an acceleration, a position, a path, or a timing for the trailer vehicle. The vehicle communication system may receive a previous driving parameter associated with the tractor vehicle, a current driving parameter associated with the tractor vehicle, or an anticipated driving parameter associated with the tractor vehicle. The execution parameter associated with the route may be determined based on the previous driving parameter, the current driving parameter, or the anticipated driving parameter associated with the tractor vehicle. The previous driving parameter, the current driving parameter, or the anticipated driving parameter associated with the tractor vehicle may include a velocity, an acceleration, a position, a path, or a timing for the tractor vehicle.

According to one or more aspects, a method for coordinated driving may include receiving a proposed driving maneuver from a tractor vehicle, receiving a response to the proposed driving maneuver from an occupant of a trailer vehicle, and generating a route corresponding to the proposed driving maneuver based on the response to the proposed driving maneuver.

The method may include disengaging the coordinated driving between the tractor vehicle and the trailer vehicle based on the response including a decline to the proposed driving maneuver or generating the route corresponding to the proposed driving maneuver based on the response including an acceptance of the proposed driving maneuver. The method may include detecting an obstacle in an operating environment. The proposed driving maneuver may correspond to a driving maneuver already executed by the tractor vehicle at a first time, where the tractor vehicle executing the driving maneuver is unimpeded by the obstacle at the first time. At a second time after the first time, the obstacle may be detected, and the obstacle may impede the route corresponding to the proposed driving maneuver. The method may include determining an alternative route corresponding to the proposed driving maneuver. The alternative route may include a delayed implementation of the route corresponding to the proposed driving maneuver or a different path than the already executed driving maneuver.

According to one or more aspects, a system for coordinated driving may include a vehicle electronic control unit (ECU) monitoring and defining a driving maneuver executed by a tractor vehicle from one or more executed driving maneuvers and a vehicle communication system transmitting a proposed driving maneuver to a trailer vehicle. The proposed driving maneuver may be associated with the driving maneuver already executed by the tractor vehicle. The vehicle communication system may receive a response to the proposed driving maneuver from the trailer vehicle. The system may include a route generation module generating a route corresponding to the proposed driving maneuver based on the response to the proposed driving maneuver. The vehicle communication system may transmit the route to the trailer vehicle based on the response.

DETAILED DESCRIPTION

Figure 1:
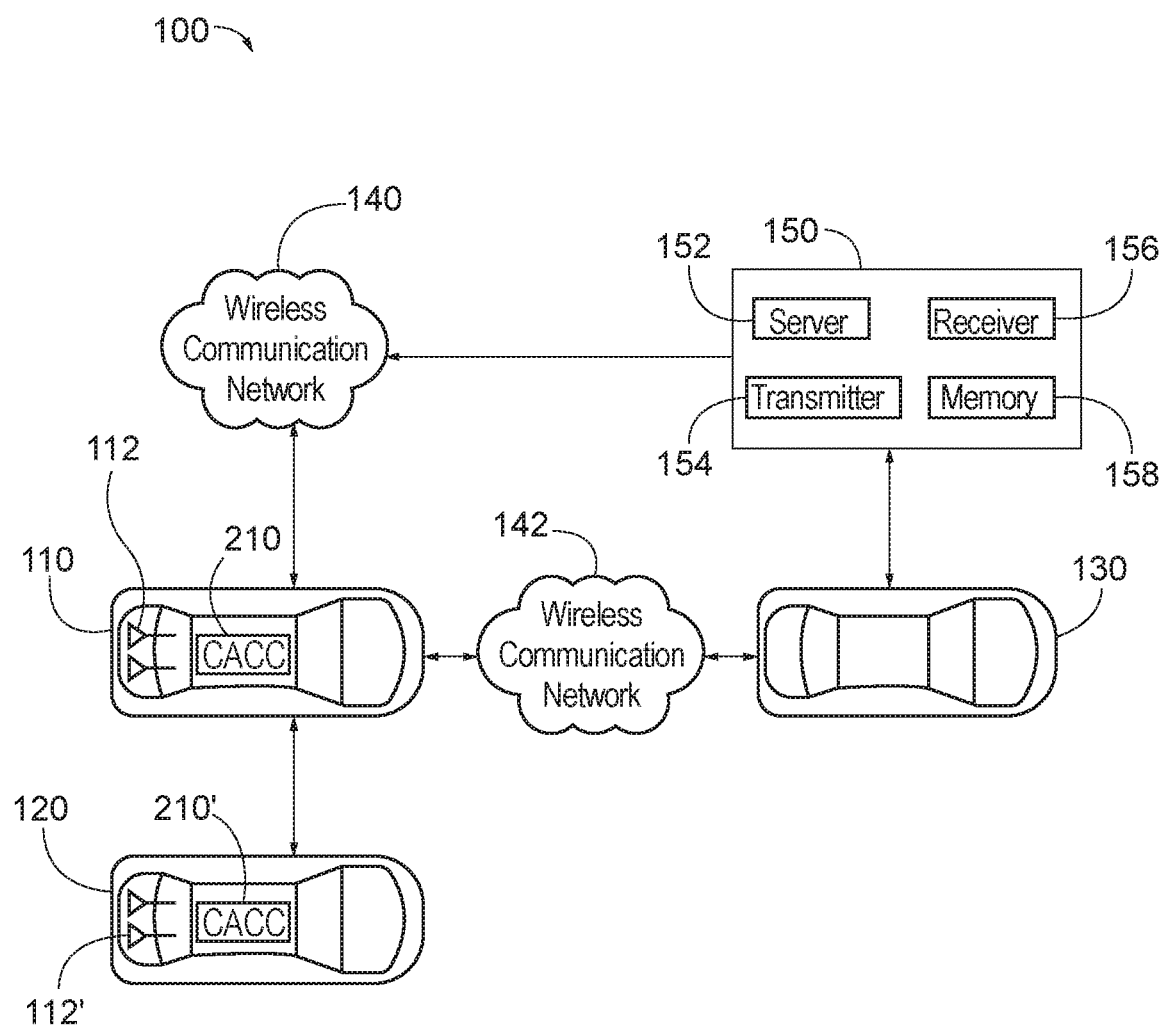
FIG. 1 is an illustration of a vehicle communications network, according to one or more aspects.

The following terms are used throughout the disclosure, the definitions of which are provided herein to assist in understanding one or more aspects of the disclosure.

"Vehicle", as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which a vehicle is travelling or is projected to travel along.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components, such as the modules, systems, devices, unit, or any of the components of FIG. 2. Multiple modules may be combined into one module and single modules may be distributed among multiple modules.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Processor Area network (CAN), Local Interconnect network (LIN), among others.

"Communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", or a connection by which entities are "operably connected", is one in which signals, physical communications, and/or logical communications may be sent and/or received. An operable connection may include a wireless interface, a physical interface, a data interface, and/or an electrical interface.

"Virtual tow", virtual towing, or "coordinated driving" is defined as a tractor vehicle (or leader vehicle, host vehicle) moving (e.g., towing) a trailer vehicle (or follower vehicle, remote vehicle) without using a physical connection between the vehicles and without the vehicles being in physical contact with each other. This may be based on transmitting, receiving, or exchanging communications including data, images, messages, or other information with other vehicles or infrastructure using dedicated short range communication (DSRC). The DSRC may be implemented between a DSRC transceiver and other DSRC transceivers.

The term "V2X" may be used to describe "vehicle-to-everything" communications, and variations of V2X designations may depend on the intended user that is transmitting DSRC signals, and "V2V" may be used to describe "vehicle-to-vehicle" communications.

FIG. 1 is an illustration of a vehicle communications network 100, according to one or more aspects. The vehicle communications network 100 may include one or more wireless networks which enable two or more vehicles (e.g., a first vehicle 110, second vehicle 120, and third vehicle 130) to communicate with one another. The first vehicle 110 (and similarly, the second and third vehicles) may include a cooperative adaptive cruise control (CACC) module 210, 210' that may receive and/or transmit and assess traffic information and data. Components of the CACC module 210 may exchange vehicle and traffic data messages, alerts, vehicle locations, or other information with other V2V compatible vehicles (e.g., the second and third vehicles, among others) via a V2V transceiver 112, 112'.

The CACC module 210 may transmit and receive information directly or indirectly to or from a server 150 over a wireless communications network 140. The server may include a remote server 152, a transmitter 154, a receiver 156, and a memory 158 which are in communication with one another. The first vehicle 110 may receive data and information from the server 150 directly through the wireless communications network 140. Examples of wireless communications networks may include television, radio, cellular, satellite networks, etc. The first vehicle 110 (e.g., as a tractor vehicle or leader vehicle) may be engaged in segment-by-segment coordinated driving with the second vehicle 120 (e.g., as a trailer vehicle or follower vehicle) utilizing the CACC module 210.

The V2V transceiver 112, 112' may receive and transmit information to and from the server 150 or other information providers through the wireless communications networks 140, 142 or a broadband network, such as the Internet. The V2V transceiver 112, 112' may include a radio frequency (RF) transceiver to receive and transmit information to and from the server 150 through a wireless network antenna to the wireless communications networks 140, 142. The RF transmitter may include a wireless phone, a wireless modem, a Wi-Fi compatible transceiver, or any other device that communicates with other networks using the wireless communications networks 140, 142. The server 150 may be a traffic data supplier or another information supplier supplying traffic data, vehicle location and heading data, high-traffic event schedules, weather data, GPS data, or other transport related data, etc. In this way, most any type of data may be provided by the server 150 to any of the vehicles within the vehicle communications network 100.

The server 150 may be linked to multiple vehicles through a network connection, such as via the wireless network antenna, and/or other network connections. Further, any other wireless communication system capable of delivering data may be used such as satellite, cellular, Wi-Fi, microwave, etc. The server 150 may be linked by a wired connection, such as a broadband cable or fiber optic connection, Ethernet, DSL, ADSL, telephone modems, and/or any other wired communication system capable of delivering data to traffic infrastructure.

The first vehicle 110 and the second vehicle 120 may communicate with one another, form an operable connection or be engaged in coordinated driving using V2V communications, which may be implemented by dedicated short-range communication (DSRC) via the V2V transceiver 112, 112' or wireless access in vehicular environments (WAVE), as will be discussed herein.

Figure 2:
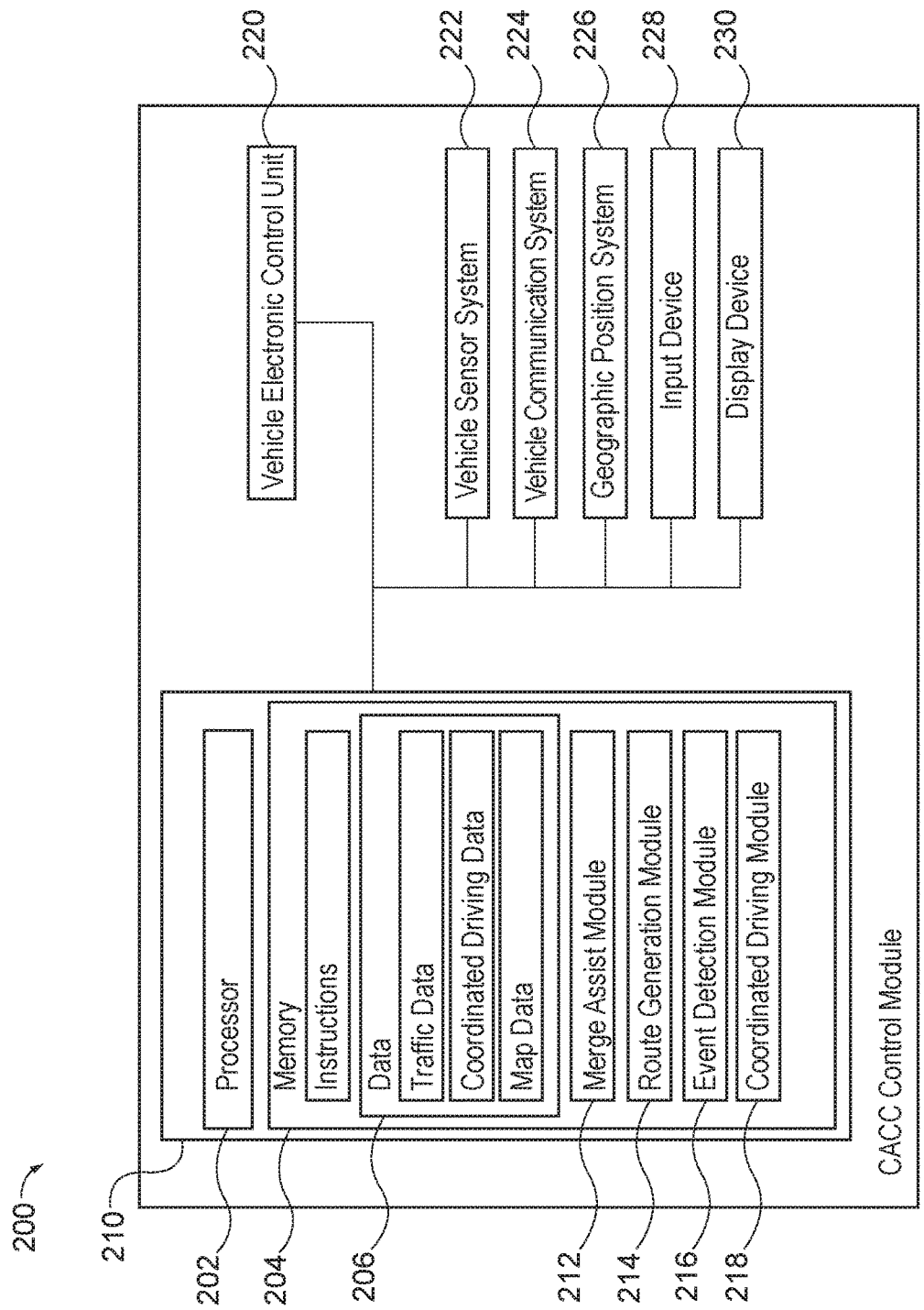
FIG. 2 is an illustration of a system for coordinated driving including a coordinated adaptive cruise control (CACC) module, according to one or more aspects.

FIG. 2 is an illustration of a system 200 for coordinated driving including the CACC module 210. The CACC module 210 may be implemented via a processor 202 and a memory 204. The memory may house or store instructions, data 206, and one or more modules, including a merge assist module 212, a route generation module 214, an event detection module 216, and a coordinated driving module 218. The system 200 for coordinated driving may also include a vehicle electronic control unit (ECU) 220, a vehicle sensor system 222, a vehicle communication system 224, a geographic positioning system (GPS) unit 226, an input device 228, and a display device 230.

As previously discussed, the first vehicle 110 (e.g., acting as the leader vehicle or the tractor vehicle) and the second vehicle 120 (e.g., acting as the follower vehicle or the trailer vehicle) of the vehicle communications network 100 may be equipped with the system 200 for coordinated driving and the CACC module 210 of FIG. 2. According to one or more aspects, the tractor vehicle and the trailer vehicle may engage in a coordinated adaptive cruise control (CACC) relationship based on a request or a prompt from one vehicle to the other. Either vehicle may initiate the CACC relationship, such as by providing the prompt or request to the other vehicle via the input device 228 (e.g., touch screen, voice command, etc.). For example, an occupant of the tractor vehicle may invite the trailer vehicle to follow the tractor vehicle using segment-by-segment coordinated driving, by transmitting a corresponding request to the trailer vehicle using the vehicle communication system 224, which may include the V2V transceiver 112, 112' or DSRC transceiver described above. As another example, an occupant of the trailer vehicle may request a lead using segment-by-segment coordinated driving, by transmitting a corresponding request to the tractor vehicle in a similar manner. When an affirmative response (to either the invite or the request) is received, the CACC relationship or V2V communications may be initiated.

In this regard, when a driver of the tractor vehicle executes one or more driving maneuvers or leads the trailer vehicle with one or more leading maneuvers, the vehicle ECU 220 may monitor these driving maneuvers and one or more corresponding aspects, characteristics, or parameters associated with the respective driving maneuvers. Further, the vehicle ECU 220 may combine two or more of these driving maneuvers or leading maneuvers into a single driving maneuver. For example, a lane change maneuver to an adjacent lane, followed by an acceleration maneuver (e.g., around an obstacle vehicle), followed by another lane change maneuver to the original lane may be defined by the vehicle ECU 220 as a passing maneuver. In any event, the vehicle ECU 220 may monitor or define a driving maneuver executed by the tractor vehicle from one or more previously executed, already executed, currently being executed, or future (e.g., to be executed) driving maneuvers.

As discussed, driving maneuvers may include a lane change maneuver, a passing maneuver, an acceleration maneuver, a deceleration maneuver, a stop maneuver, a turning maneuver, a parking maneuver, etc. The CACC module 210 may determine or monitor one or more execution parameters associated with the respective driving maneuvers. For example, an execution parameter may include a velocity, an acceleration, a position, a path, or a timing associated with the driving maneuver for the tractor vehicle. In this way, the tractor vehicle may communicate information (i.e., parameters) pertaining to an already executed driving maneuver, a currently executed driving maneuver, or an anticipated driving maneuver to the trailer vehicle. For example, if the GPS unit 226 of the tractor vehicle is navigation from an origin location to a destination location, and there is an upcoming turn, this may be communicated to the trailer vehicle as an anticipated driving parameter.

Regardless, the tractor vehicle may utilize the vehicle communication system 224 to transmit a previous driving parameter associated with the tractor vehicle, a current driving parameter associated with the tractor vehicle, or an anticipated driving parameter associated with the tractor vehicle to the vehicle communication system 224 of the trailer vehicle (which receives the respective driving parameters). In this way, the CACC module 210 may command the vehicle communication system 224 to transmit a proposed driving maneuver to a trailer vehicle.

The proposed driving maneuver may be determined by the vehicle ECU 220 based on the already executed driving maneuver, currently executed driving maneuver, anticipated driving maneuver and include one or more driving parameters associated therewith (e.g., the previous driving parameter associated with the already executed driving maneuver, the current driving parameter associated with the currently executed driving maneuver, or the anticipated driving parameter associated with the anticipated driving maneuver). Stated another way, once the tractor vehicle initiates an initial driving maneuver (or series of driving maneuvers which are consolidated into a single driving maneuver), associated or corresponding information (e.g., execution parameters) pertaining to this move may be gathered, packaged, and transmitted to the trailer vehicle engaged in segment-by-segment coordinated driving with the tractor vehicle.

Figure 5:
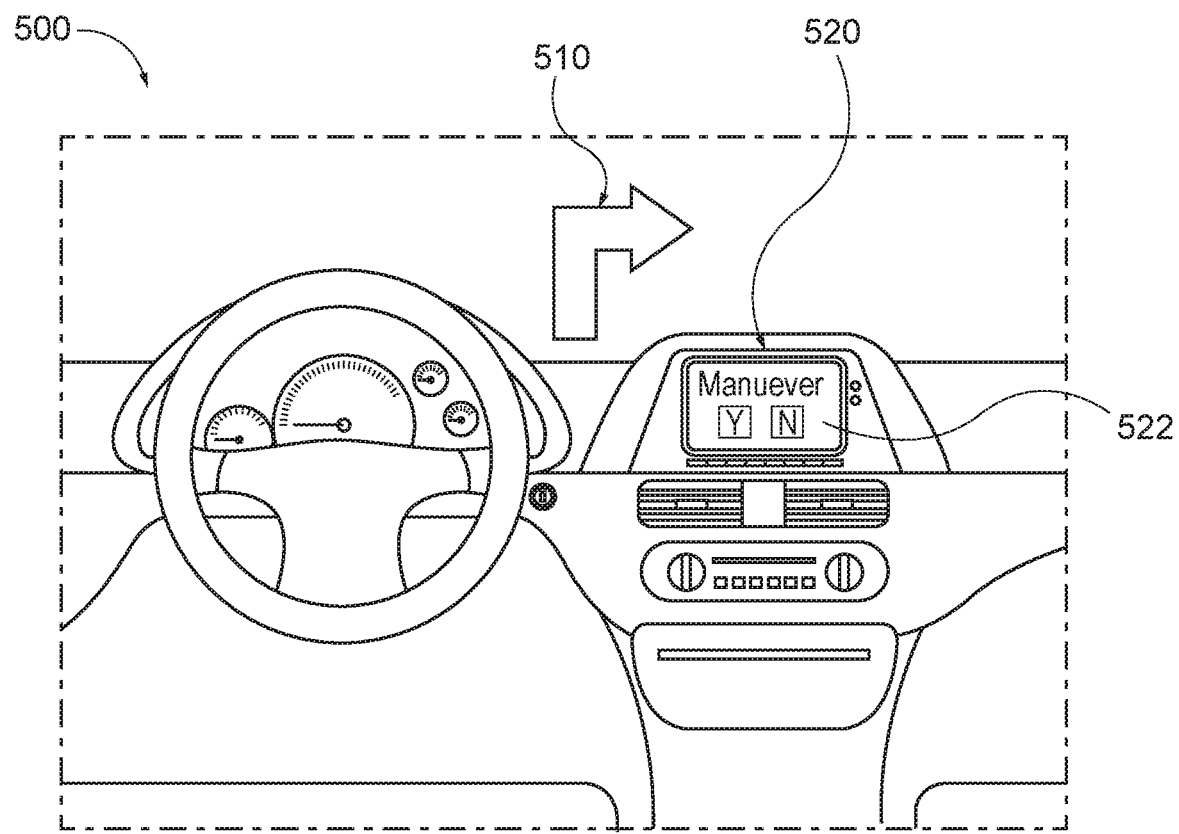
FIG. 5 is an illustration of a coordinated driving scenario, according to one or more aspects.

The vehicle communication system 224 of the trailer vehicle may receive the proposed driving maneuver and associated driving parameters from the tractor vehicle, and present this proposed driving maneuver to the driver of the trailer vehicle. To the trailer vehicle, these driving parameters may be indicative of the proposed driving maneuver. For example, the display device 230 of the trailer vehicle may render a graphical representation of the proposed driving maneuver for the driver. In this regard, the display device 230 may be an augmented reality display, a center console display, a liquid crystal display, etc. Regardless, the display device 230 enables the driver to visually assess the proposed driving maneuver by providing a prompt, an alert, or a notification regarding the proposed driving maneuver. An example of a rendered proposed driving maneuver is shown in FIG. 5. Although a visual type notification is provided in this example, audio or tactile type feedback may be provided, according to other aspects.

After the proposed driving maneuver is presented or rendered to the driver of the trailer vehicle, the driver (or other occupant) of the trailer vehicle may utilize the input device 228 to provide a response to the proposed driving maneuver. In other words, the input device 228 may receive the response to the proposed driving maneuver from the occupant of the trailer vehicle. The vehicle communication system 224 of the trailer vehicle may transmit this response to the vehicle communication system 224 of the tractor vehicle. If the response includes an acceptance of the proposed driving maneuver, both the tractor vehicle and the trailer vehicle may be engaged in segment-by-segment coordinated driving based on CACC. Alternatively, if the response includes a decline to the proposed driving maneuver, the vehicle communication system 224 (of either the trailer vehicle or the tractor vehicle) may disengage the virtual towing or coordinated driving between the tractor vehicle and the trailer vehicle.

In any event, when the tractor vehicle is engaged in segment-by-segment virtual towing with the trailer vehicle (e.g., after the response to the proposed driving maneuver including an acceptance is received by the tractor vehicle and both vehicles are placed in a CACC mode by their respective CACC modules 210, 210'), the CACC module 210 may coordinate driving between the tractor vehicle and the trailer vehicle. The proposed driving maneuver transmitted to the trailer vehicle may include driving parameters which are indicative of the already executed, currently executed, or future (to be executed) driving maneuver performed by the tractor vehicle. In other words, the proposed driving maneuver and associated driving parameters lets the trailer vehicle 'know' what the tractor vehicle 'did' as far as the driving maneuver. Stated yet another way, the vehicle communication system 224s of the tractor vehicle and trailer vehicle may broadcast the driving maneuver information (e.g., as a message sent from the tractor vehicle to the trailer vehicle).

As previously discussed, the respective driving parameters may include indications of one or more timings, maneuvers, number of maneuvers, a velocity, an acceleration, a position, a path, a following distance, or associated targets (e.g., target velocity, target acceleration, target distance, etc.) the trailer vehicle may utilize or implement to perform coordinated driving. For example, if the tractor vehicle performs a passing maneuver at five miles over a posted speed limit, the proposed driving maneuver to the trailer vehicle may be similar to the passing maneuver performed by the tractor vehicle, except at a velocity associated with the posted speed limit rather than over the speed limit. In this regard, the CACC module 210 may introduce other variations, adjust, or modify one or more of the driving parameters associated with the proposed driving maneuver in this regard (e.g., based on speed limits, detected objects, changes in traffic, surrounding environment, road conditions, etc.).

In this way, information from the server 150, the GPS unit 226, the vehicle communication system 224, the vehicle sensor system 222, or any of the components of FIG. 2 may be received by the CACC module 210 and utilized to modify these driving parameters in a safe, efficient manner. In other words, the CACC module 210 may determine an execution parameter associated with a route (generated by the route generation module 214) corresponding to the proposed driving maneuver including a timing, a maneuver, a number of maneuvers, a velocity, an acceleration, a position, a path, a following distance, or associated target for the trailer vehicle. This execution parameter may be determined based on the previous driving parameters, the current driving parameters, or the anticipated driving parameters associated with the tractor vehicle.

The route generation module 214 may generate a route corresponding to the proposed driving maneuver based on the response of the proposed driving maneuver and/or based on the adjustments to the driving parameters associated with the proposed driving maneuver made by the CACC module 210. As previously discussed, the route generation module 214 may generate the route corresponding to the proposed driving maneuver based on the response including the aforementioned acceptance of the proposed driving maneuver, thereby facilitating segment-by-segment coordinated driving. It will be appreciated that the route generation module 214 and/or CACC module 210, 210' of either vehicle may be utilized to adjust or modify the driving parameters and/or generate the route corresponding to the proposed driving maneuver. If the tractor vehicle performs any such operations, the route or parameters may be transmitted to the trailer vehicle. Further, any of the operations, acts, or functionality described herein with respect to any vehicle may be performed on the opposite (e.g., trailer vehicle instead of tractor vehicle or vice versa) vehicle, the server 150, a connected mobile device, etc. and transmitted to the trailer vehicle for execution (e.g., thereby having the trailer vehicle follow the tractor vehicle accordingly based on the already executed driving maneuver, current conditions, and the accepted response).

After the acceptance is received, the route generation module 214 may generate the route to command the trailer vehicle to follow the tractor vehicle. However, because traffic may be constantly changing, the trailer vehicle may not necessarily be able to take an 'identical' or corresponding path as the already executed driving maneuver, the currently executed driving maneuver, or the future 'to be executed' driving maneuver (e.g., the driving maneuver(s) associated with tractor vehicle).

For example, the vehicle sensor system 222 may include a vehicle sensor detecting an obstacle in an operating environment through which the tractor vehicle and the trailer vehicle are travelling. Upon detection of the obstacle, the event detection module 216 may make a determination as to whether the obstacle has an impact of the route corresponding to the proposed driving maneuver, as will be described in greater detail with reference to FIG. 4C. The coordinated driving module 218 may determine an alternative route corresponding to the proposed driving maneuver or provide one or more alternatives in response to the detected obstacle. One example of a reaction to the detected obstacle may be the cancellation or an automatic decline of the proposed driving maneuver, such as when the tractor vehicle is tightly wedged between two obstacle vehicles (e.g., less than a threshold distance from each obstacle vehicle such that a lane change to the same lane as the tractor vehicle is not possible). In this example, the vehicle communication system 224 may automatically respond to the proposed driving maneuver with a decline (or a partial decline of the proposed driving maneuver) based on the detected obstacle. The partial decline may be an accept to the initial lane change and acceleration maneuvers of the passing maneuver, but a decline to the lane change back to the original lane, for example. These alternatives may be automatically executed by the CACC module 210 or presented to the occupant of the trailer vehicle for selection and subsequent execution. Additionally, the merge assist module 212 may determine a timing or one or more thresholds at which the trailer vehicle may merge into a lane with an obstacle vehicle, while attempting to follow the tractor vehicle, as will be described in greater detail with reference to FIG. 4E.

Additionally, other types of information, such as GPS data, traffic data, coordinated driving data, map data, etc. may be received by the GPS unit 226 or the vehicle communication system 224 (e.g., via V2V communications via network 140 or V2X communications via network 142 and/or from other vehicles, such as vehicle 130 of FIG. 1) and utilized to supplement or make one or more determinations associated with any of the modules described herein. For example, if the tractor vehicle initiates and exit maneuver, and takes an exit on a freeway, but the driver of the trailer vehicle reacts or responds late to the prompt to follow the proposed driving maneuver of taking the exit, GPS data associated with the tractor vehicle may be received by the GPS unit 226, and the coordinated driving module 218 and/or the route generation module 214 may generate a route to lead the trailer vehicle back to the tractor vehicle (e.g., as the trailer vehicle continues on the highway, past the exit taken by the tractor vehicle).

Figure 3A:
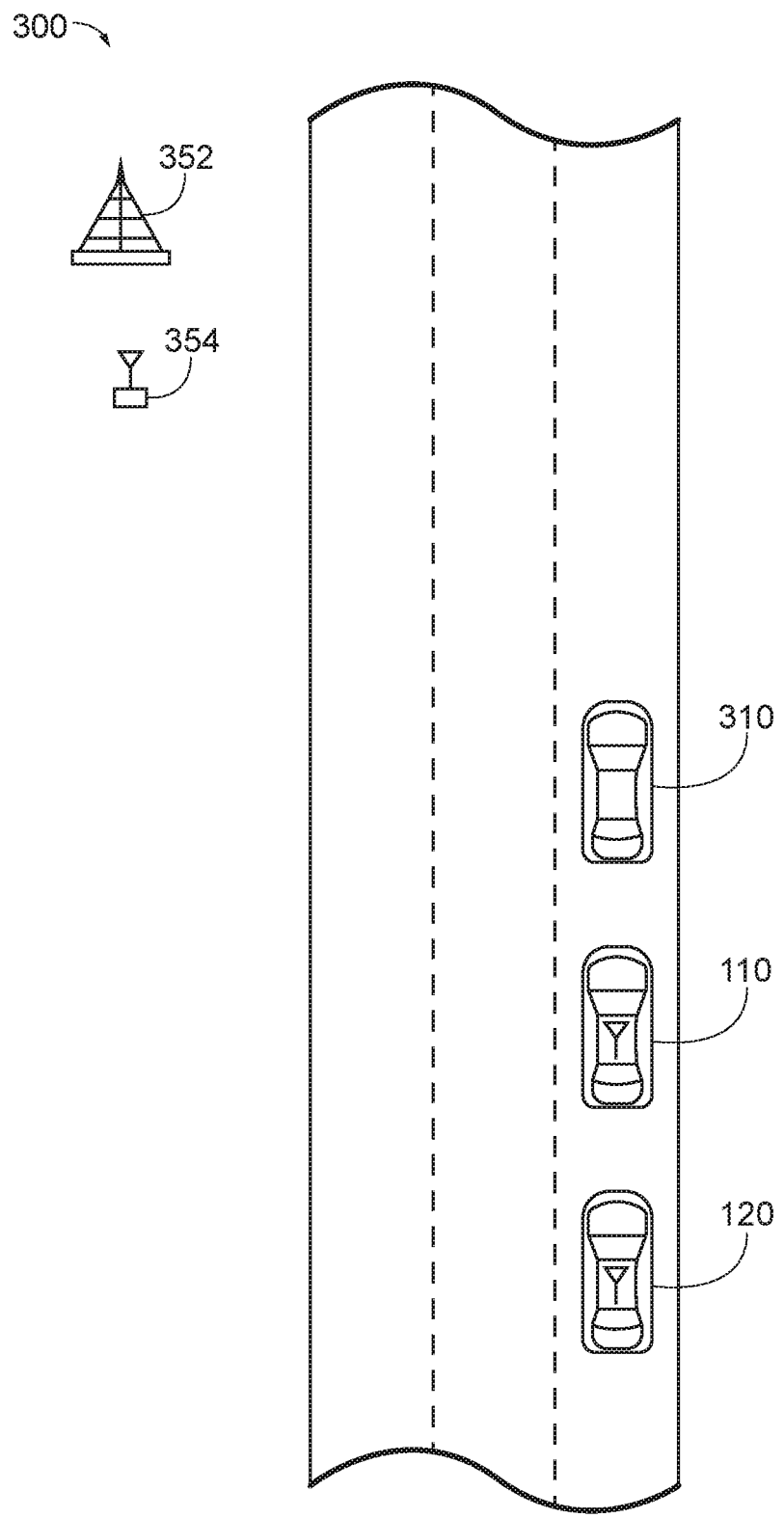
FIGS. 3A-3C are illustrations of exemplary traffic scenarios, according to one or more aspects.
Figure 3B:
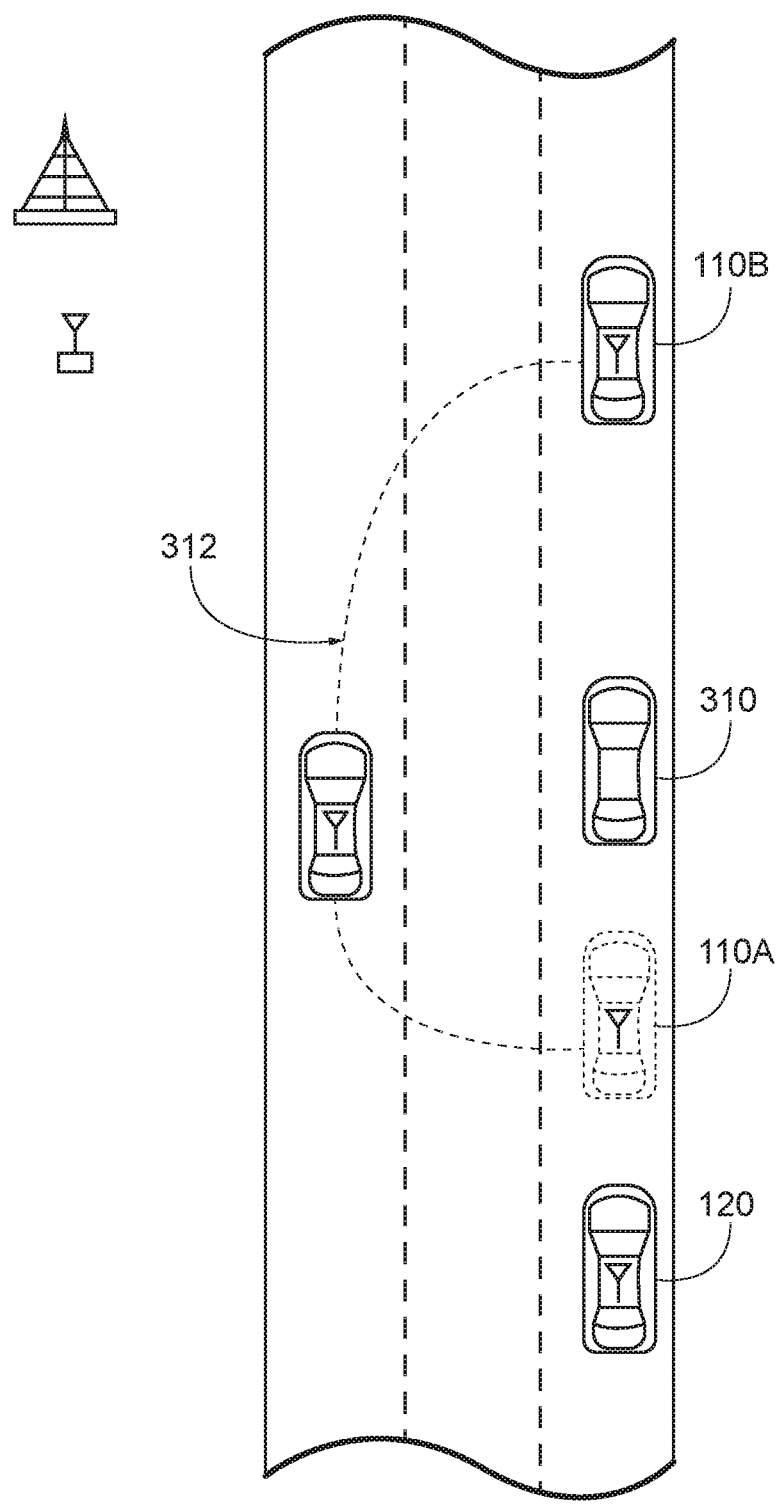
Figure 3C:
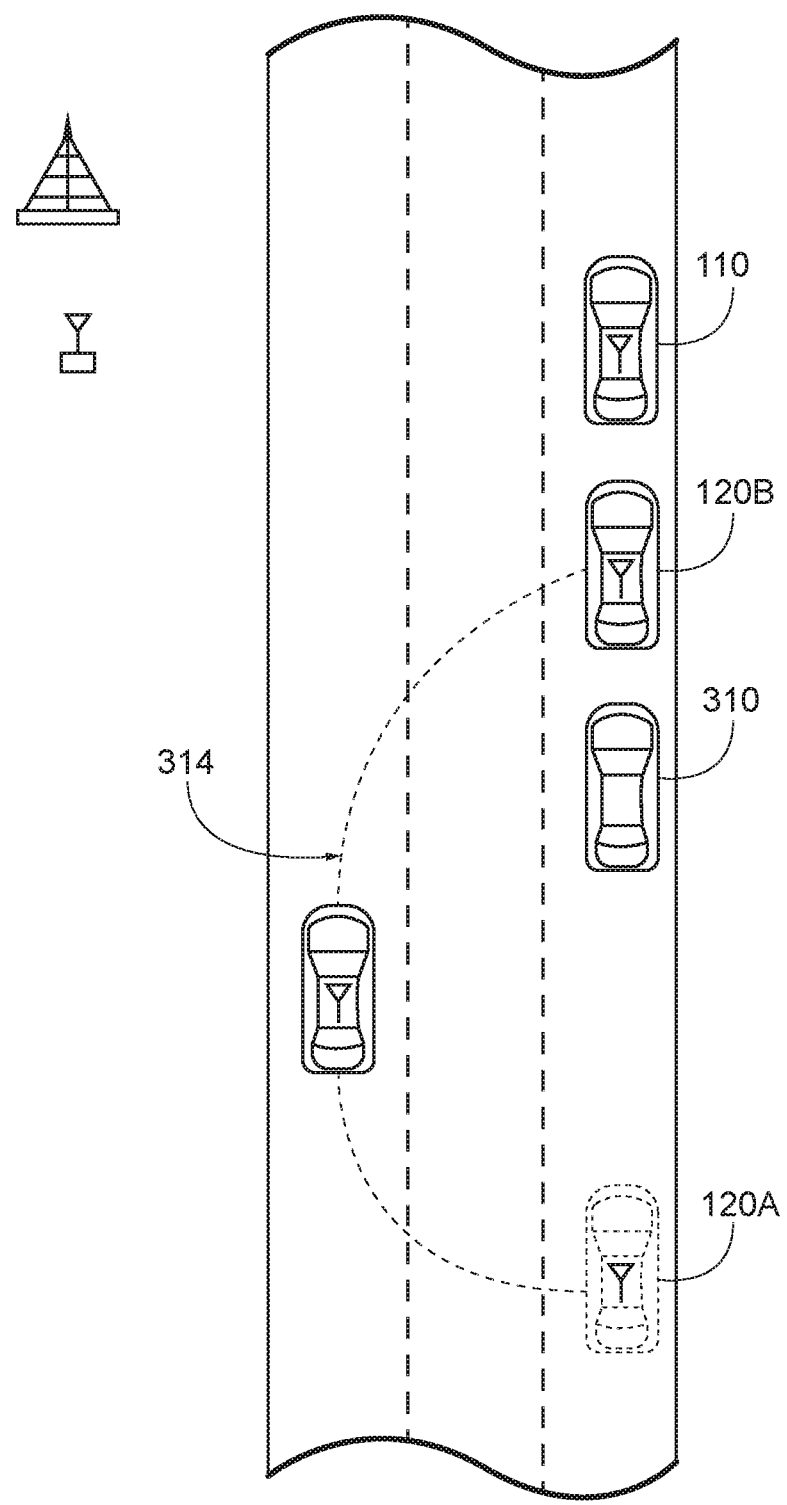

In this regard, FIGS. 3A-3C and 4A-4E are illustrations of exemplary traffic scenarios, and will be described with reference to one or more of the components of the system 200 of FIG. 2. FIGS. 3A-3C are illustrations of exemplary traffic scenarios, according to one or more aspects. Although FIGS. 3A-3C are described with respect to merely a single trailer vehicle following the tractor vehicle, other embodiments are contemplated where a group of vehicles are outfitted with the CACC module 210 and may each follow the tractor vehicle or treat the vehicle proceeding them as the tractor vehicle (although that vehicle may be a trailer vehicle with respect to another tractor vehicle). Stated another way, the group of vehicles are outfitted with the CACC modules 210, 210' may all follow a single designated tractor vehicle or 'daisy chain' such that the first vehicle 110 is a tractor vehicle with respect to a second vehicle 120, and have the second vehicle 120 be a tractor vehicle with respect to a third vehicle, etc.

In FIGS. 3A-3C and 4A-4E, the first vehicle 110 is described as the tractor vehicle and the second vehicle 120 is described as the trailer vehicle. Further, various infrastructure, vehicles, and vehicle communications network components may be disposed at or proximate to a roadway 300, including the first vehicle 110, the second vehicle 120, a first obstacle vehicle 310, a roadside equipment (RSE) 352, and a wireless network antenna 354 (e.g., for V2X communications). As seen in FIG. 3A, the first obstacle vehicle 310 is in front of the first vehicle 110 and the second vehicle 120 which is engaged in coordinated driving with the first vehicle 110. In FIG. 3B, the first vehicle 110 initiates a passing maneuver 312, from a first position 110A to a second position 110B (e.g., relative to the first obstacle vehicle 310). Information or parameters associated with this passing maneuver 312 and/or the move from the first position 110A to the second position 110B is transmitted from the vehicle communication system 224 of the first vehicle 110 to the second vehicle 120. As previously discussed, the occupant of the second vehicle 120 is presented with a prompt asking whether to engage in a similar or corresponding driving maneuver (i.e., passing the first obstacle vehicle 310 by moving from a corresponding first position to a corresponding second position). In FIG. 3C, and upon receiving an acceptance of the proposed driving maneuver, the CACC module 210' of the second vehicle 120 executes a route generated by the route generation module 214 of the second vehicle 120, where the route is associated with the same or corresponding maneuver 314 of passing the first obstacle vehicle 310 by moving from the first corresponding position 120A to the second corresponding position 120B. This may be achieved by initiating a lane change from the initial lane to another lane, executing an acceleration maneuver, and executing another lane change back to the original lane. The vehicle sensor may track and detect the first obstacle vehicle 310 and thereby enable the second vehicle 120 to execute the corresponding passing maneuver 314 in a safe fashion.

Figure 4A:
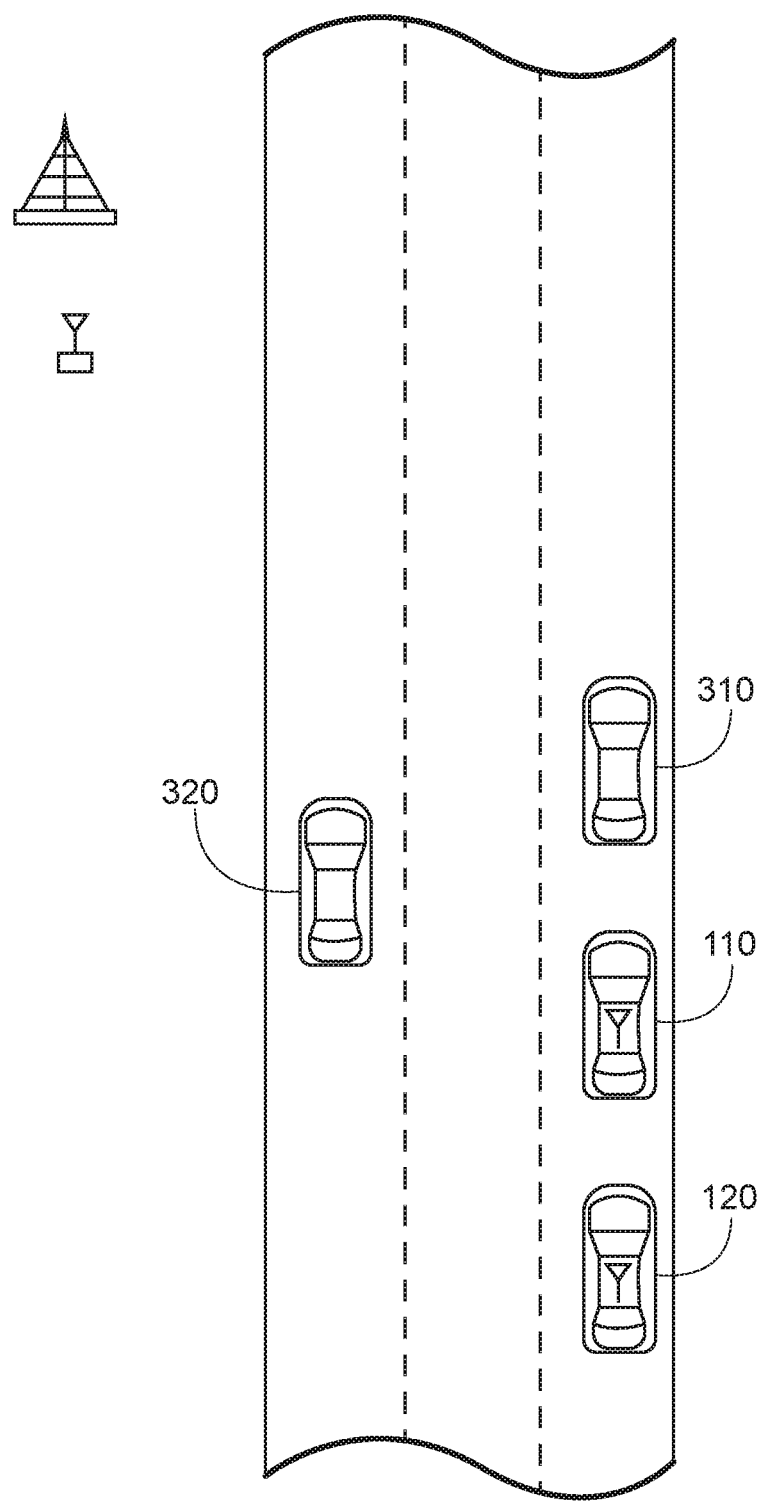
FIGS. 4A-4E are illustrations of exemplary traffic scenarios, according to one or more aspects.
Figure 4B:
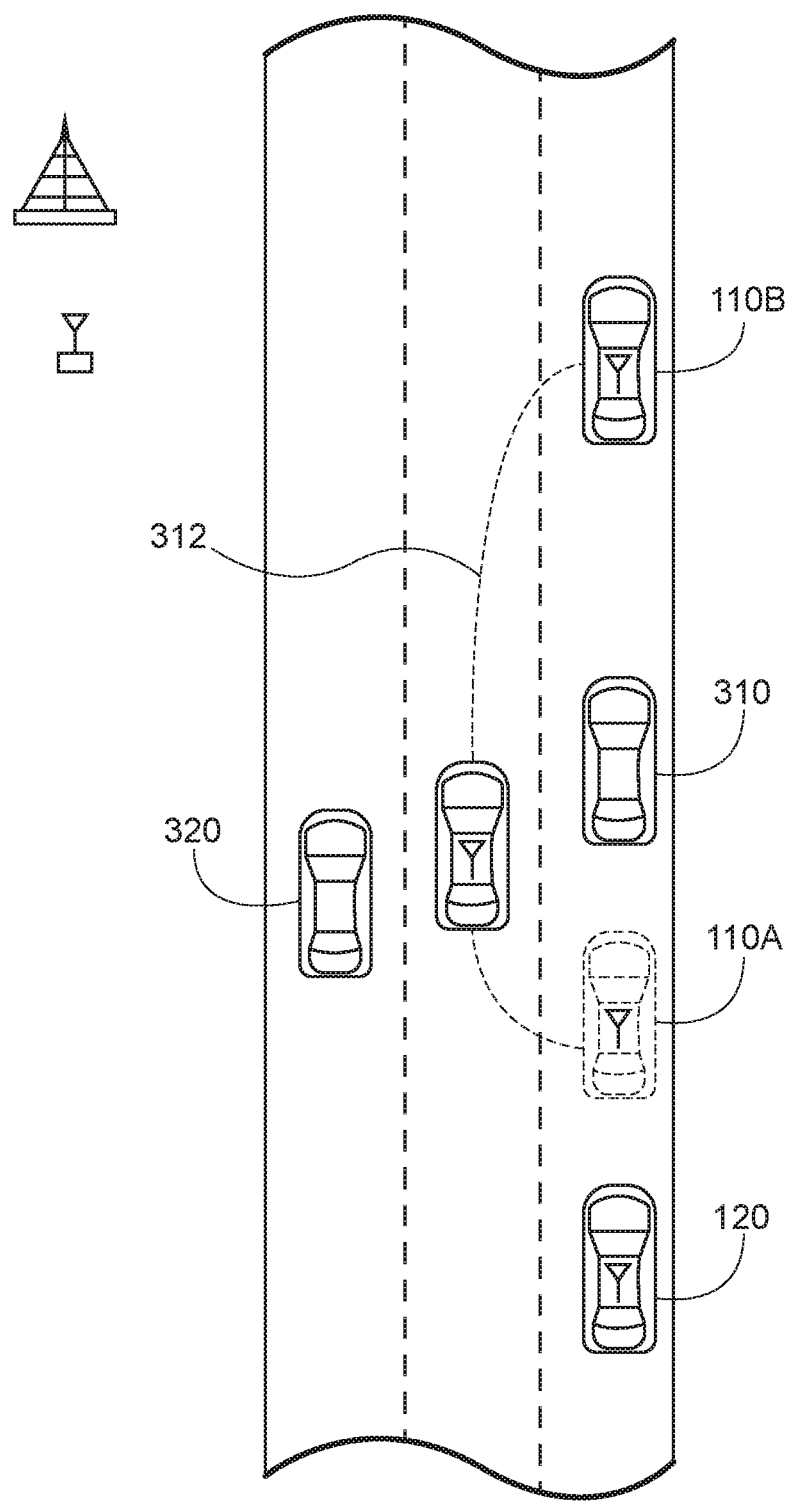

FIGS. 4A-4E are illustrations of exemplary traffic scenarios, according to one or more aspects. FIG. 4A is similar to the scenario of FIG. 3A except that in addition to the first obstacle vehicle 310, a second obstacle vehicle 320 is also present. The first obstacle vehicle 310 and the second obstacle vehicle 320 are in front of the first vehicle 110 and the second vehicle 120 in FIG. 4A. With the exception of the second obstacle vehicle 320 in FIG. 4B, the first vehicle 110 initiates a passing maneuver 312 similarly to the passing maneuver of FIG. 3B, from the first position 110A to the second position 110B. The vehicle ECU 220 of the first vehicle 110 may identify, consolidate, and/or package driving parameters associated with the driving maneuver or passing maneuver, and have the vehicle communication system 224 transmit these parameters, as a message, to the second vehicle 120, thereby enabling the CACC module 210 and route generation module 214 of the second vehicle 120 to determine a corresponding driving maneuver.

Figure 4C:
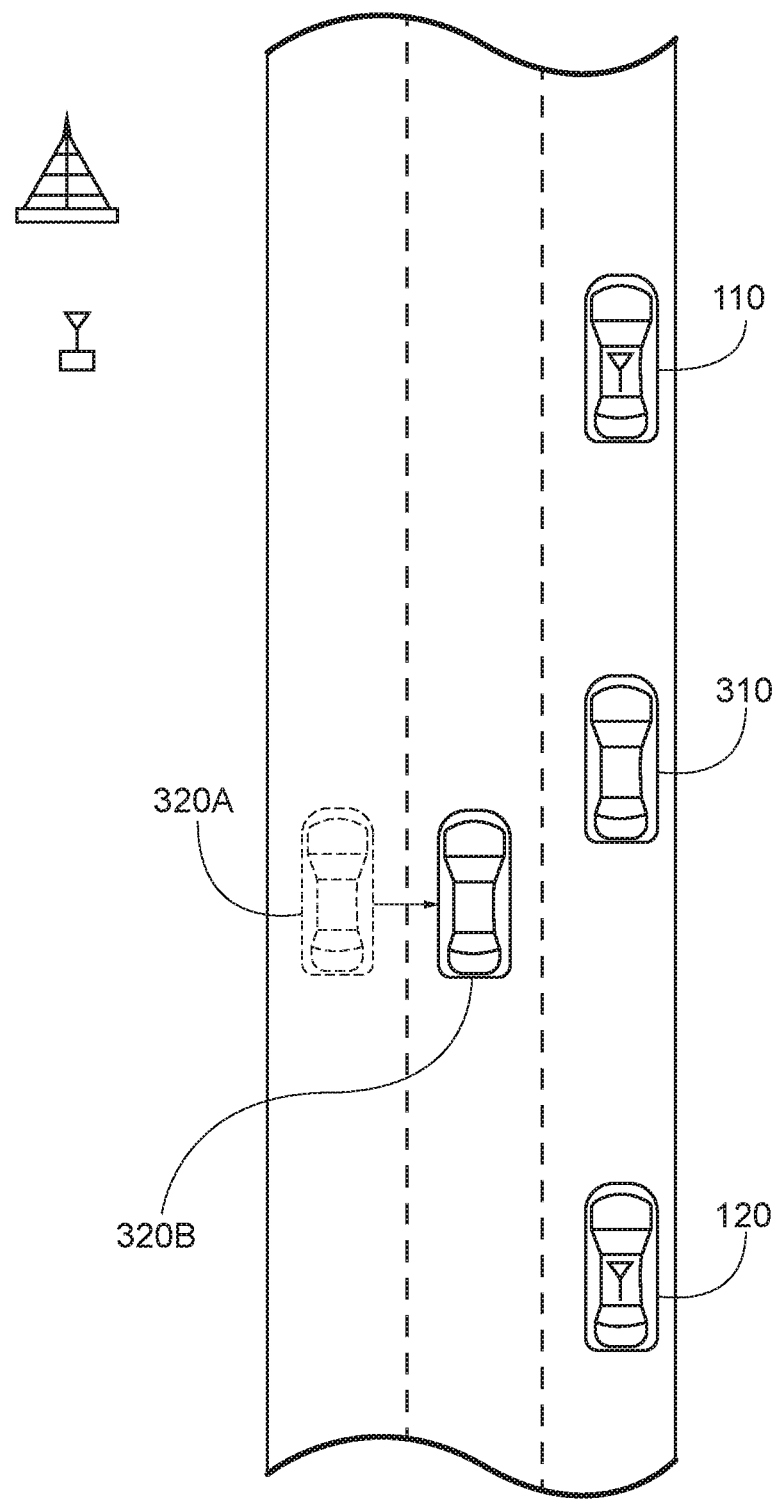

However, as seen in FIG. 4C, the second obstacle vehicle 320 moves from a first position 320A to a second position 320B, thereby 'blocking' the second vehicle 120 from taking a similar path in making the passing maneuver. In this regard, the proposed driving maneuver may correspond to the driving maneuver already executed by the tractor vehicle, at a first time (e.g., a time from FIG. 4B, when the tractor vehicle executing the driving maneuver was unimpeded by the second obstacle vehicle 320). Because the second obstacle vehicle 320 has impeded the path of the corresponding passing maneuver, and this obstacle is detected by the vehicle sensor of the second vehicle 120 (e.g., the vehicle sensor detects the obstacle at a second time in FIG. 4C after the first time in FIG. 4B) impedes the route corresponding to the proposed driving maneuver, the coordinated driving module 218 may determine an alternative or alternative route corresponding to the proposed driving maneuver. For example, the coordinated driving module 218 may postpone the route corresponding to the proposed driving maneuver until the second obstacle vehicle 320 moves. In other words, the alternative route may include a delayed implementation of the route corresponding to the proposed driving maneuver. The coordinated driving module 218 may also have the route generation module 214 generate a different passing path (e.g., a different path than the already executed driving maneuver), according to other aspects.

Figure 4D:
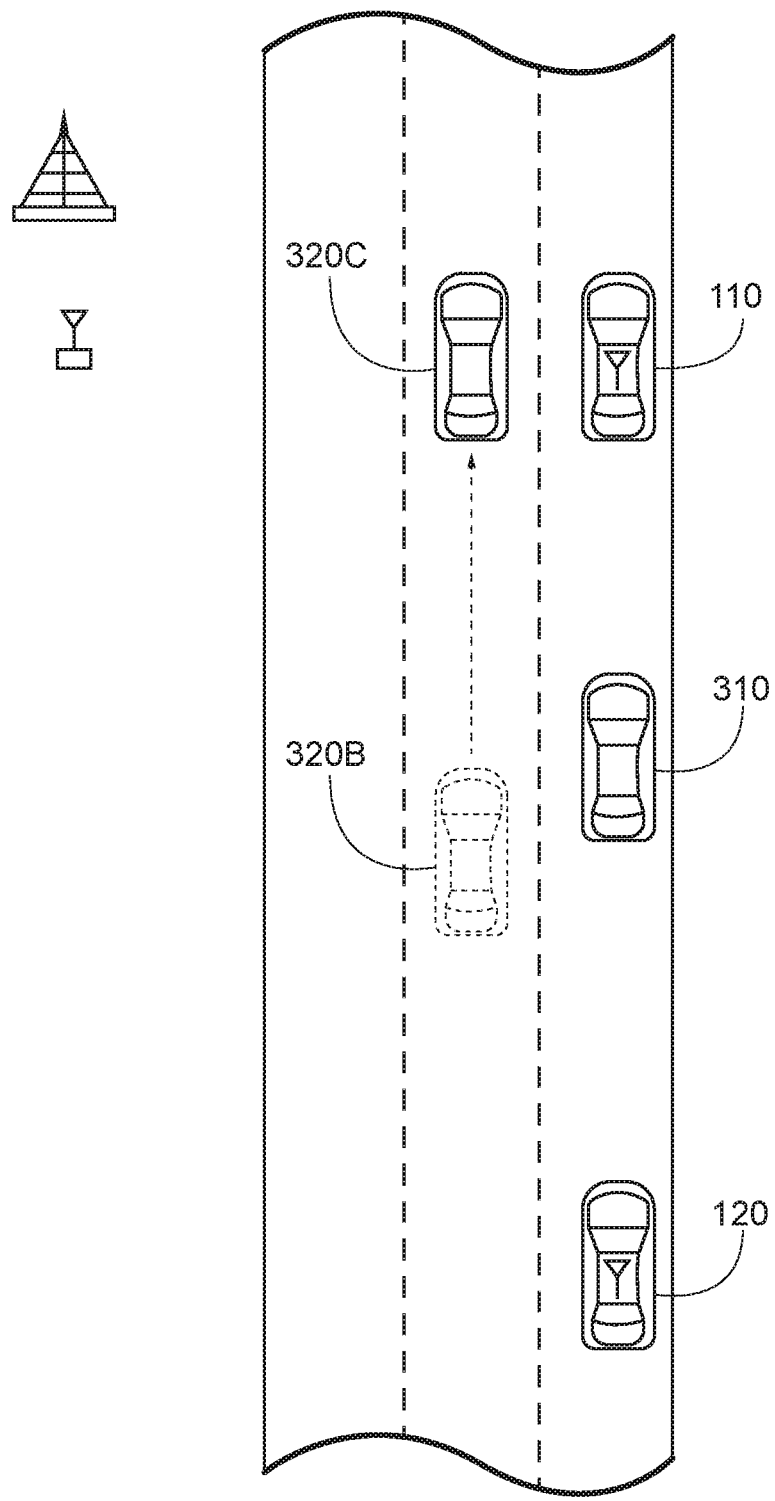
Figure 4E:
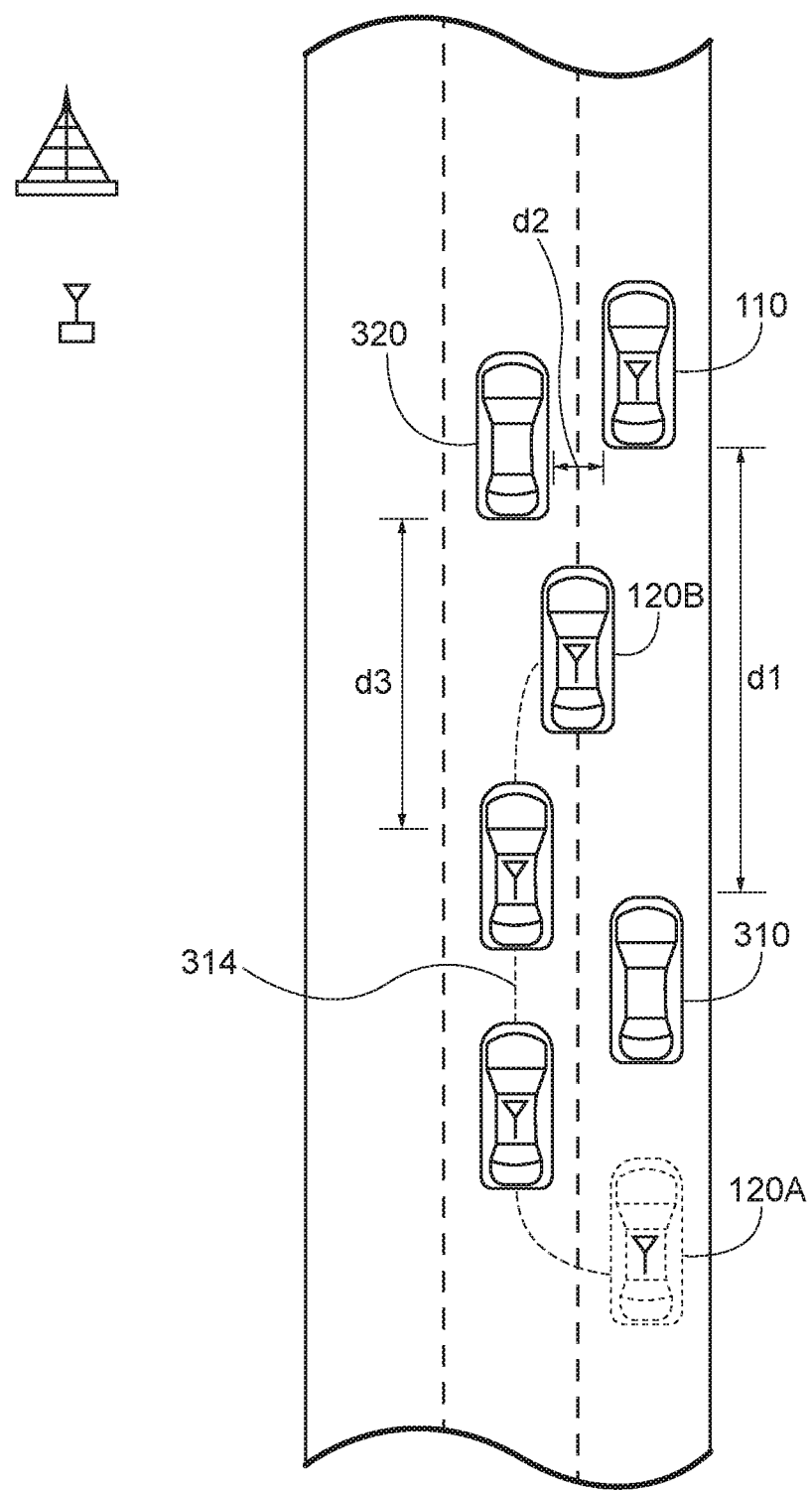

In FIG. 4D, the second obstacle vehicle 320 eventually moves from the second position 320B to a third position 320C, thereby enabling the coordinated driving module 218 to execute the delayed implementation of the route corresponding to the proposed driving maneuver, as shown in FIG. 4E. The corresponding passing maneuver 314 may be initiated according to one or more threshold distances d1, d2, d3 (i.e., safety thresholds between the first vehicle 110 and other obstacle vehicles).

FIG. 5 is an illustration of a coordinated driving scenario 500, according to one or more aspects. In FIG. 5, a driver or occupant of the vehicle may be prompted 522 with the proposed driving maneuver 510, which may be projected or displayed as a graphic element and a user interface 520 rendered, enabling the user to accept or decline the proposed driving maneuver.

Figure 6:
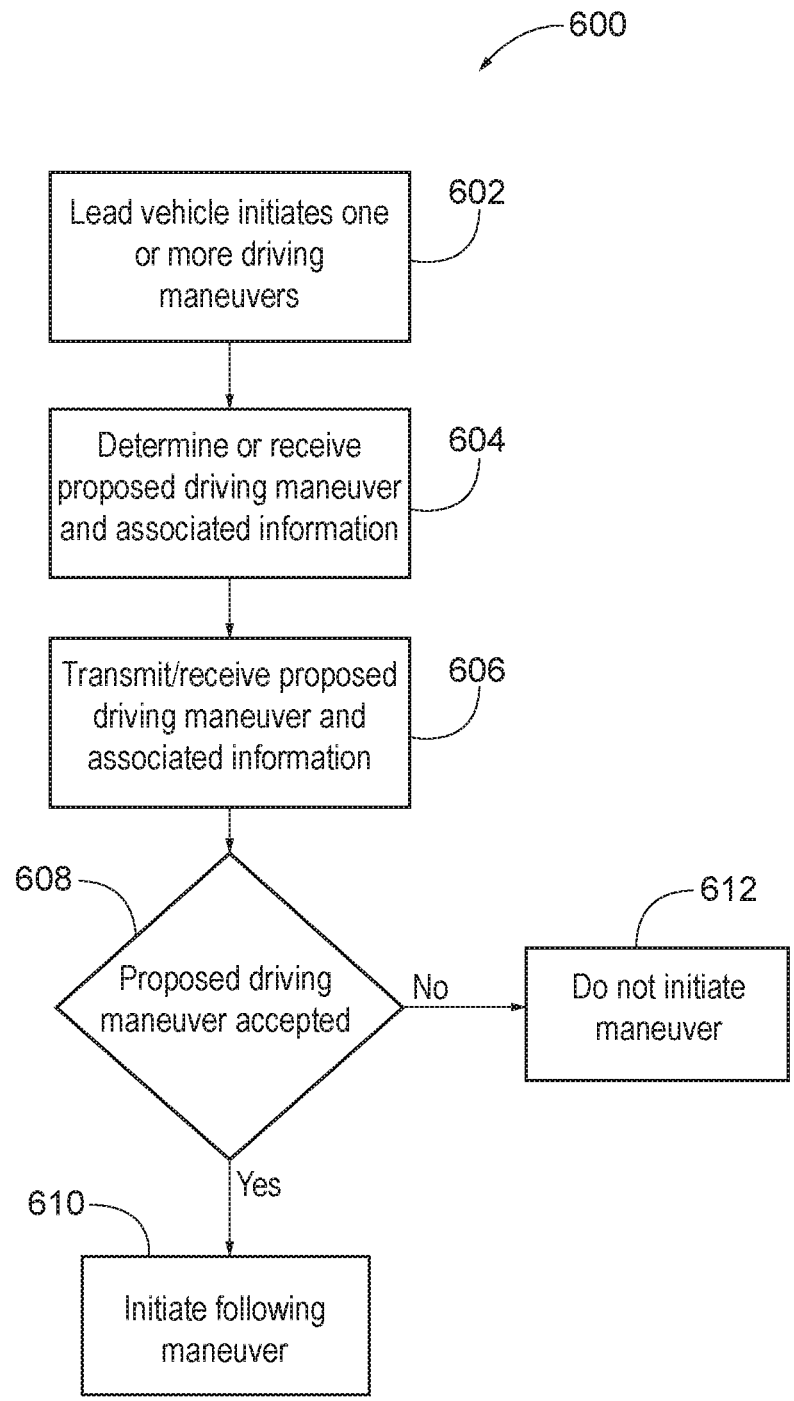
FIG. 6 is an illustration of an example flow diagram of a method for coordinated driving, according to one or more aspects.

FIG. 6 is an illustration of an example flow diagram of a method 600 for coordinated driving, according to one or more aspects. The method may include having a lead vehicle initiate one or more driving maneuvers at 602, determining, receiving, or consolidating a proposed driving maneuver and associated information (e.g., as driving parameters) at 604, transmitting and/or receiving the proposed driving maneuver and associated parameters or information at 606, prompting the occupant of the following vehicle at 608, and if the prompt is declined, not engaging in any maneuvers at 612, or if the prompt is accepted, initiating a corresponding driving maneuver at 610.

According to one or more aspects, the route generation module may generate the route corresponding to the proposed driving maneuver based on the response including an acceptance of the proposed driving maneuver. Further, an updated driving maneuver may be automatically accepted or declined proposed driving maneuver. In other words, if the driving maneuver is currently being executed, and additional information pertaining to the current driving maneuver is provided after an acceptance has been made, the updated driving maneuver may be auto-accepted or incorporated into the corresponding driving maneuver for the trailer vehicle. For example, the vehicle communication system may receive an updated driving maneuver from the tractor vehicle and the route generation module may automatically generate an updated route corresponding to the driving maneuver and updated driving maneuver based on the response including the already accepted proposed driving maneuver.

Figure 7:
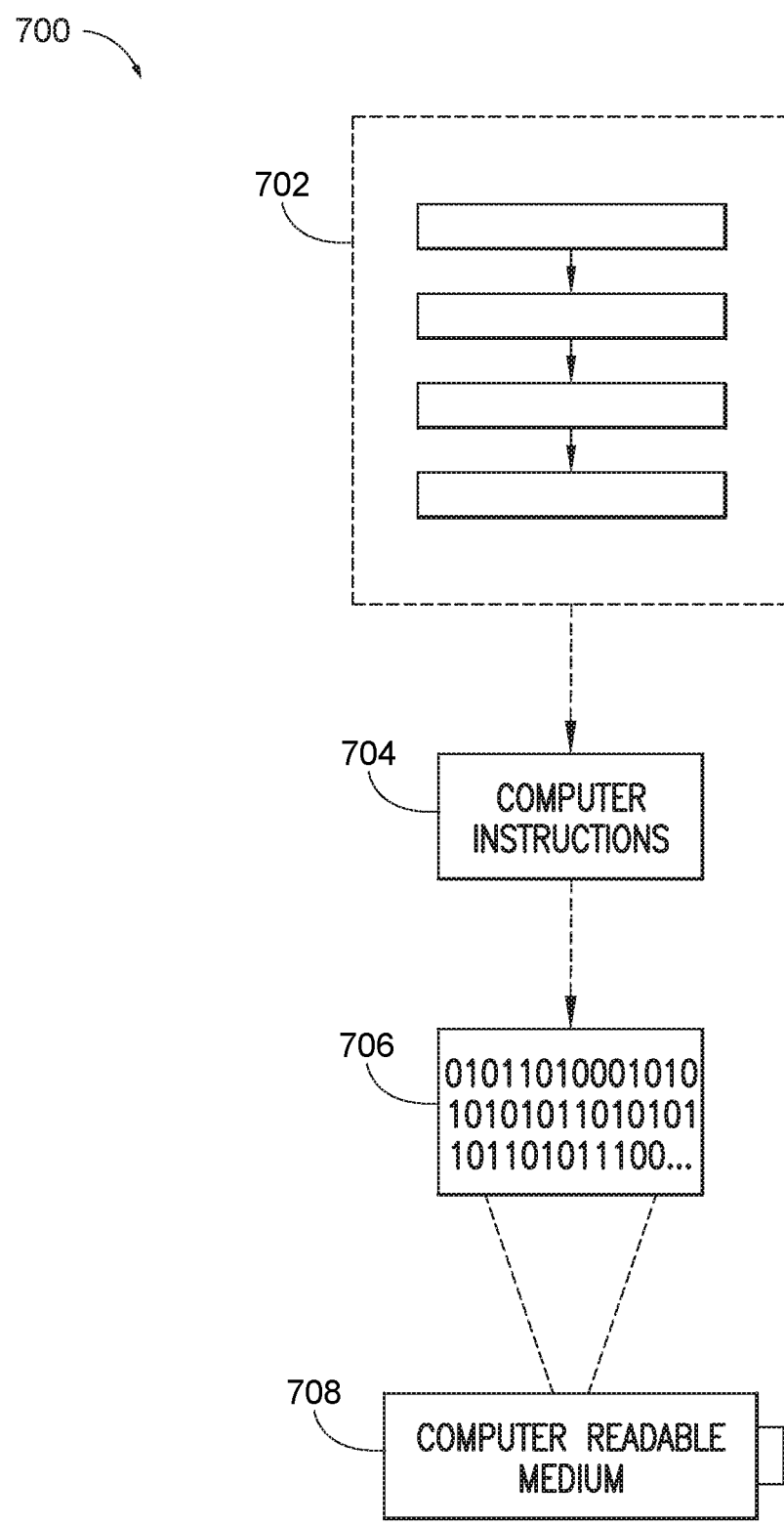
FIG. 7 is an illustration of an example computer-readable medium or computer-readable device including processor-executable instructions configured to embody one or more of the provisions set forth herein, according to one or more aspects.

Still another embodiment involves a computer-readable medium including processor-executable instructions configured to implement one or more aspects of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded as computer-readable data 706. This computer-readable data 706, such as binary data including a plurality of zero's and one's as shown in 706, in turn includes a set of processor-executable computer instructions 704 configured to operate according to one or more of the principles set forth herein. In one such embodiment 700, the processor-executable computer instructions 704 may be configured to perform a method 702, such as the method 600 of FIG. 6. In another embodiment, the processor-executable computer instructions 704 may be configured to implement a system, such as the system 200 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
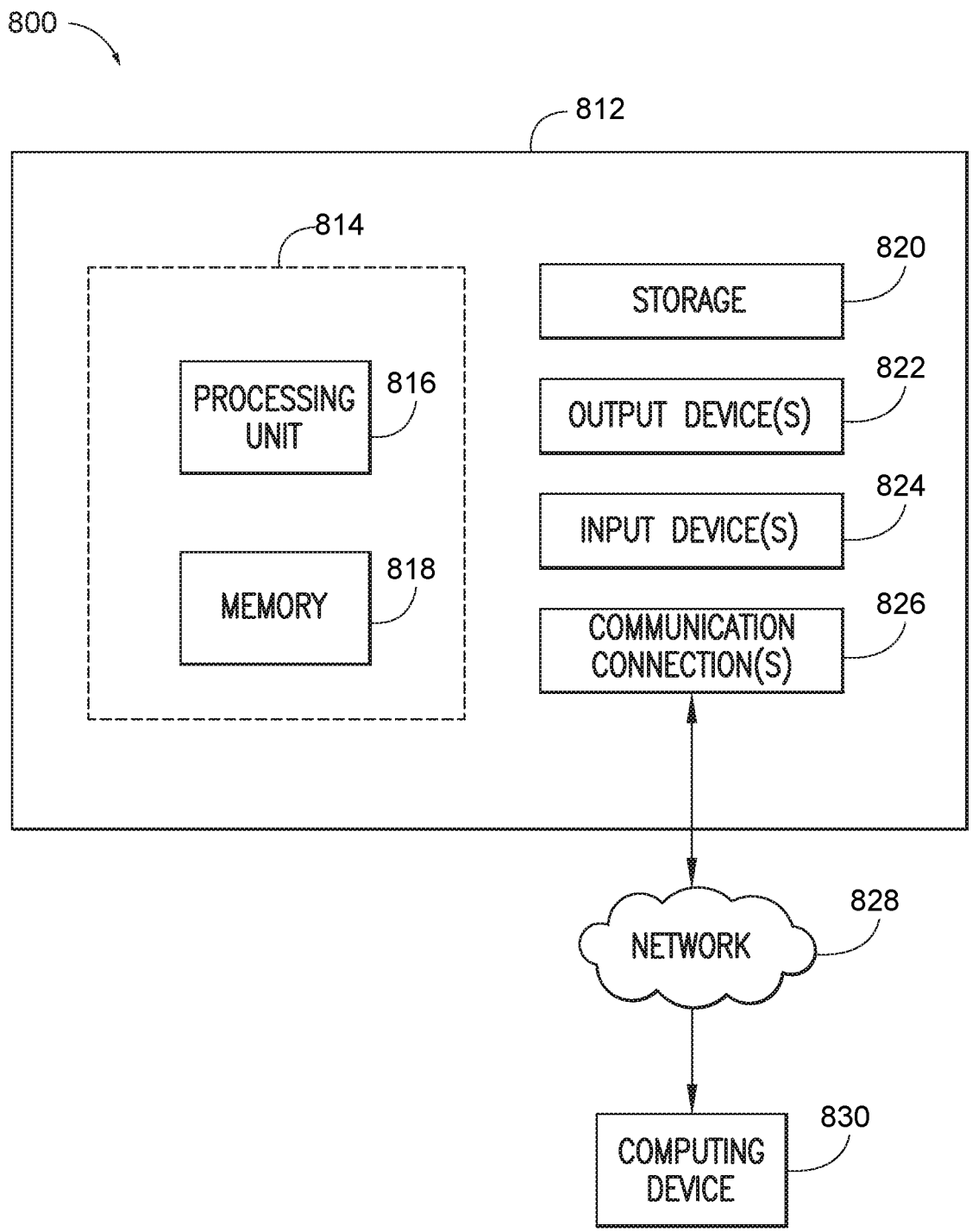
FIG. 8 is an illustration of an example computing environment where one or more of the provisions set forth herein are implemented, according to one or more aspects.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more aspects provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, computing device 812 includes additional features or functionality. For example, computing device 812 may include additional storage such as removable storage or non-removable storage, including, but not limited to, magnetic storage, optical storage, etc. Such additional storage is illustrated in FIG. 8 by storage 820. In one or more aspects, computer readable instructions to implement one or more aspects provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 812. Any such computer storage media is part of computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its parameters set or changed in such a manner as to encode information in the signal.

Computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with computing device 812. Input device(s) 824 and output device(s) 822 may be connected to computing device 812 via a wired connection, wireless connection, or any combination thereof. In one or more aspects, an input device or an output device from another computing device may be used as input device(s) 824 or output device(s) 822 for computing device 812. Computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for coordinated driving, comprising:
a vehicle communication system receiving a proposed driving maneuver from a tractor vehicle, wherein the proposed driving maneuver includes an executed driving maneuver associated with the tractor vehicle including a velocity of the tractor vehicle during the executed maneuver within an area having a posted speed limit and the tractor vehicle is currently engaged in segment-by-segment coordinated driving with the trailer vehicle in the area having the posted speed limit;
an input device receiving a response to the proposed driving maneuver from an occupant of a trailer vehicle; and
a route generation module generating a route corresponding to the proposed driving maneuver based on the response to the proposed driving maneuver,
wherein the route generation module generates the route corresponding to the proposed driving maneuver based on the response including a partial decline to the proposed driving maneuver, wherein the partial decline to the proposed driving maneuver includes a lane change from a current lane of the trailer vehicle to a lane associated with the tractor vehicle.

2. The system for coordinated driving of claim 1, wherein the tractor vehicle is engaged in segment-by-segment coordinated driving with the trailer vehicle utilizing a cooperative adaptive cruise control (CACC) module.

3. The system for coordinated driving of claim 1, wherein the proposed driving maneuver includes a driving maneuver currently being executed or already executed by the tractor vehicle.

4. The system for coordinated driving of claim 1, wherein the proposed driving maneuver is a lane change maneuver, a passing maneuver, an acceleration maneuver, a deceleration maneuver, a stop maneuver, a turning maneuver, or a parking maneuver.

5. The system for coordinated driving of claim 1,
wherein the vehicle communication system disengages the coordinated driving between the tractor vehicle and the trailer vehicle based on the response including a decline to the proposed driving maneuver; or
wherein the route generation module generates the route corresponding to the proposed driving maneuver based on the response including an acceptance of the proposed driving maneuver.

6. The system for coordinated driving of claim 1, comprising a vehicle sensor detecting an obstacle in an operating environment.

7. The system for coordinated driving of claim 6,
wherein the proposed driving maneuver includes a driving maneuver already executed by the tractor vehicle at a first time, wherein the tractor vehicle executing the driving maneuver is unimpeded by the obstacle;
wherein the vehicle sensor detects the obstacle at a second time after the first time, the obstacle impeding the route corresponding to the proposed driving maneuver;
the system comprising a coordinated driving module determining an alternative route corresponding to the proposed driving maneuver.

8. The system for coordinated driving of claim 7, wherein the alternative route includes a delayed implementation of the route corresponding to the proposed driving maneuver or a different path than the already executed driving maneuver.

9. The system for coordinated driving of claim 1,
wherein the route generation module generates the route corresponding to the proposed driving maneuver based on the response including an acceptance of the proposed driving maneuver;
wherein the vehicle communication system receives an updated driving maneuver from the tractor vehicle; and
wherein the route generation module automatically generates an updated route corresponding to the driving maneuver and updated driving maneuver based on the response including the already accepted proposed driving maneuver.

10. The system for coordinated driving of claim 1, wherein the vehicle communication system automatically responds to the proposed driving maneuver with a decline based on a detected obstacle.

11. The system for coordinated driving of claim 1, comprising a cooperative adaptive cruise control (CACC) module determining an execution parameter associated with the route corresponding to the proposed driving maneuver including a velocity, an acceleration, a position, a path, or a timing for the trailer vehicle.

12. The system for coordinated driving of claim 1, wherein the vehicle communication system receives a previous driving parameter associated with the tractor vehicle, a current driving parameter associated with the tractor vehicle, or an anticipated driving parameter associated with the tractor vehicle.

13. The system for coordinated driving of claim 12, wherein the execution parameter associated with the route is determined based on the previous driving parameter, the current driving parameter, or the anticipated driving parameter associated with the tractor vehicle.

14. The system for coordinated driving of claim 13, wherein the previous driving parameter, the current driving parameter, or the anticipated driving parameter associated with the tractor vehicle includes a velocity, an acceleration, a position, a path, or a timing for the tractor vehicle.

15. A method for coordinated driving, comprising:
receiving a proposed driving maneuver from a tractor vehicle, wherein the proposed driving maneuver includes an executed driving maneuver associated with the tractor vehicle including a velocity of the tractor vehicle during the executed maneuver within an area having a posted speed limit and the tractor vehicle is currently engaged in segment-by-segment coordinated driving with the trailer vehicle in the area having the posted speed limit;
receiving a response to the proposed driving maneuver from an occupant of a trailer vehicle; and
generating a route corresponding to the proposed driving maneuver based on the response to the proposed driving maneuver, wherein the response includes a partial decline to the proposed driving maneuver, wherein the partial decline to the proposed driving maneuver includes a lane change from a current lane of the trailer vehicle to a lane associated with the tractor vehicle.

16. The method of claim 15, comprising:
disengaging the coordinated driving between the tractor vehicle and the trailer vehicle based on the response including a decline to the proposed driving maneuver; or
generating the route corresponding to the proposed driving maneuver based on the response including an acceptance of the proposed driving maneuver.

17. The method of claim 15, comprising detecting an obstacle in an operating environment.

18. The method of claim 17,
wherein the proposed driving maneuver includes a driving maneuver already executed by the tractor vehicle at a first time, wherein the tractor vehicle executing the driving maneuver is unimpeded by the obstacle;
wherein the method includes detecting the obstacle at a second time after the first time, the obstacle impeding the route corresponding to the proposed driving maneuver; and
determining an alternative route corresponding to the proposed driving maneuver.

19. The method of claim 18, wherein the alternative route includes a delayed implementation of the route corresponding to the proposed driving maneuver or a different path than the already executed driving maneuver.

20. A system for coordinated driving, comprising:
a vehicle electronic control unit (ECU) monitoring and defining a driving maneuver associated with a tractor vehicle;
a vehicle communication system transmitting a proposed driving maneuver to a trailer vehicle, wherein the proposed driving maneuver includes an executed driving maneuver associated with the tractor vehicle including a velocity of the tractor vehicle during the executed maneuver within an area having a posted speed limit and the tractor vehicle is currently engaged in segment-by-segment coordinated driving with the trailer vehicle in the area having the posted speed limit, the vehicle communication system receiving a response to the proposed driving maneuver from the trailer vehicle; and a route generation module generating a route corresponding to the proposed driving maneuver based on the response to the proposed driving maneuver, wherein the response includes a partial decline to the proposed driving maneuver, wherein the partial decline to the proposed driving maneuver includes a lane change from a current lane of the trailer vehicle to a lane associated with the tractor vehicle, the vehicle communication system transmitting the route to the trailer vehicle based on the response.

\* \* \* \* \*